Oct. 7, 1969
R. N. ARCARI
3,471,100
SELF-ADJUSTING SAFETY REEL
Filed May 17, 1966
2 Sheets-Sheet 1
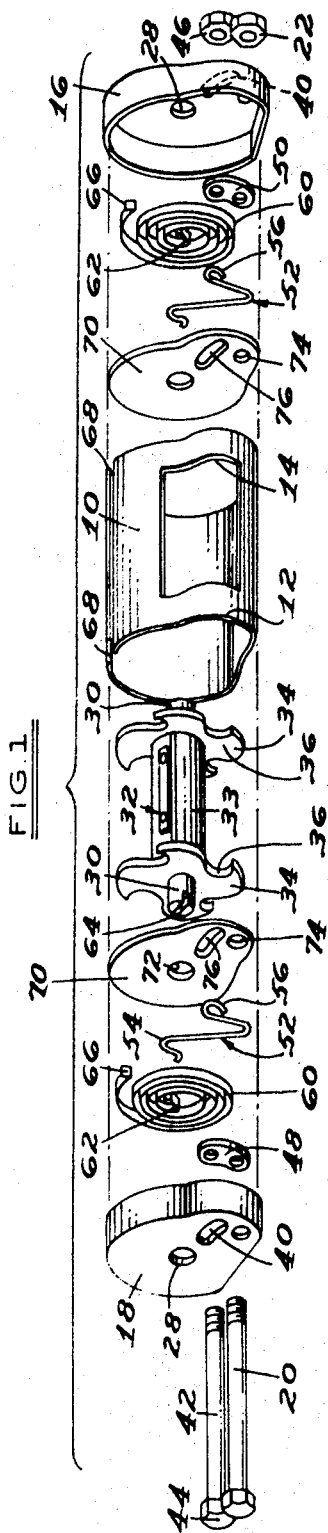
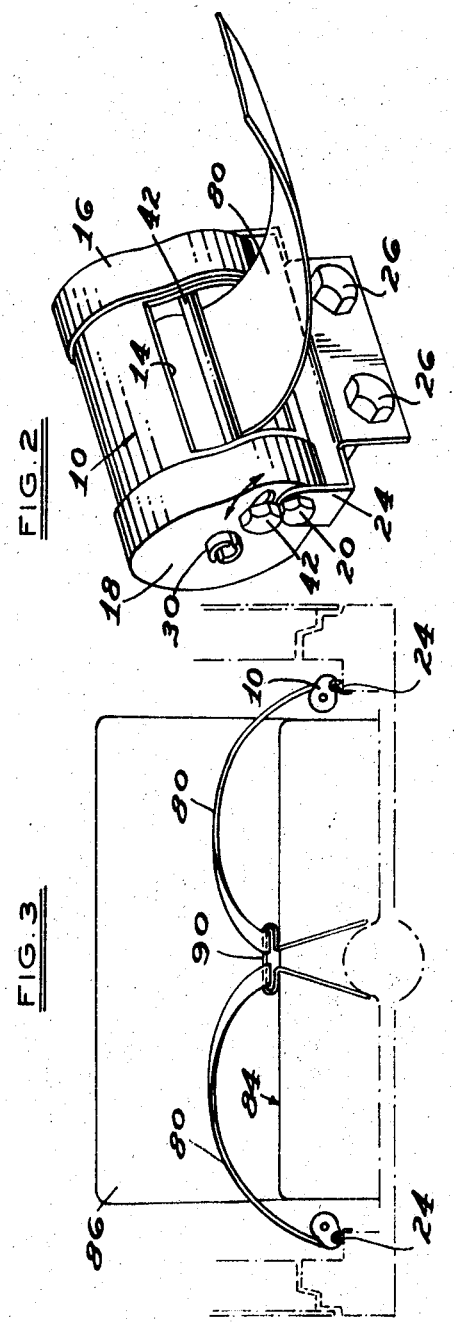
INVENTOR
ROBERT N. ARCARI
BY
Barnes, Kisselle, Raisch & Choate
ATTORNEYS Oct. 7, 1969 R. N. ARCARI 3,471,100
SELF-ADJUSTING SAFETY REEL
Filed May 17, 1966 2 Sheets-Sheet 2
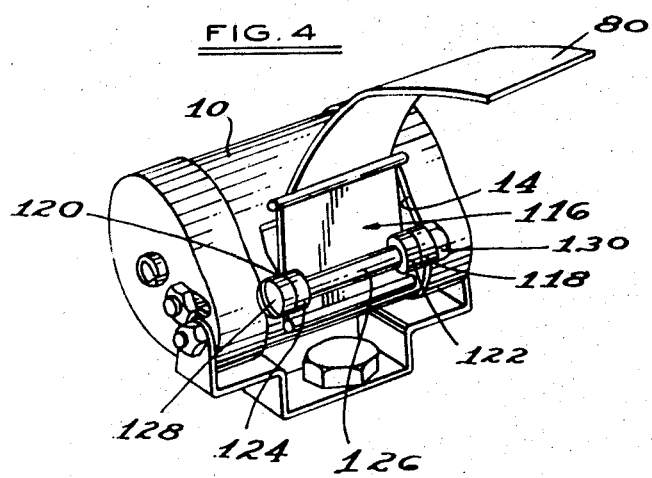
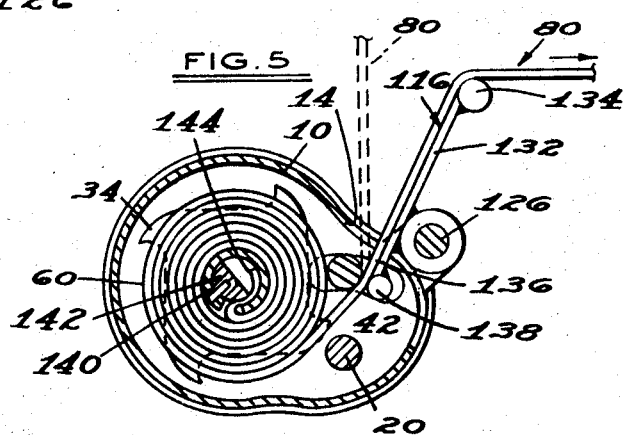
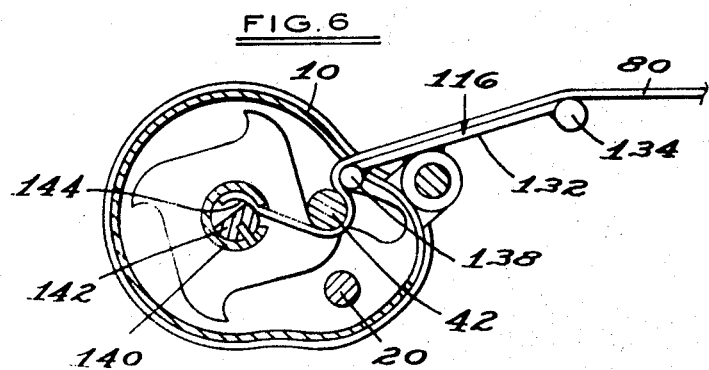
INVENTOR
ROBERT N. ARCARI
BY
Barnes, Kisselle, Raisch & Choate
ATTORNEYS

United States Patent Office 3,471,100
Patented Oct. 7, 1969

3,471,100
SELF-ADJUSTING SAFETY REEL
Robert N. Arcari, 571 W. Lewiston,
Ferndale, Mich. 48220
Filed May 17, 1966, Ser. No. 550,837
Int. Cl. B65h 75/48
U.S. Cl. 242—107.4                                    9 Claims

ABSTRACT OF THE DISCLOSURE

A self-adjusting safety reel for seat belts comprising a retracting reel for storage of the seat belt and dispensing the same and a locking bar positioned adjacent the reel to cooperate with ratcheted teeth on the ends of the reel, the locking bar being biased away from the reel and the safety belt being threaded passed the locking bar in such a way that in normal use the locking bar will be disengaged from the reel to permit in and out motion of the belt, the locking bar being actuated by a sudden force on the belt to engage the teeth of the reel to lock it for safety purposes.

---

This invention relates to a self-adjusting safety reel for seat belts and more particularly is directed to a fully automatic, self-adjusting storage and dispensing reel for seat belts as are normally used in moving vehicles.

It is well known that seat belts are now almost standard equipment in passenger vehicles as well as in aircraft. When a seat belt of the standard type is firmly secured, there is considerable restriction on the movement of the passenger in the seat.

It is an object of the present invention to provide a seat belt reel which will afford considerable comfort to the passenger in that he can move about almost normally without restriction with the use of the reel constructed in accordance with the present invention; but in the event of any sudden force being applied to the belt, it will automatically and instantaneously lock to suitably restrain the passenger against the forces of inertia. There are a number of patents existing on devices of this general nature, and it is an object of the present invention to provide a simplified structure which is economical to manufacture and which has a fool-proof operation.

It is a further object to provide a device which is not dependent on springs for its locking acton so that the loss of function of any spring in the mechanism will not destroy its function as a safety device.

A further object is the provision of an automatic, self-adjusting reel which can be utilized with a reasonably light pressure on the passenger and yet which will function without fail to a stop position in the event of any sudden motion.

Other objects and features of the invention will be apparent in the following description and claims wherein the manner of manufacturing and using the device is shown and illustrated and there is set forth the best mode contemplated by the inventor for carrying out the invention.

Drawings accompany the disclosure and the various views thereof may be briefly described as:

FIGURE 1, a view of the device showing the parts in exploded relationship for a quick understanding of the device.

FIGURE 2, a view of the device as assembled.

FIGURE 3, a view of the device as installed in, for example, a passenger car.

FIGURE 4, a perspective view of a modified construction.

FIGURE 5, a sectional view of the modified device illustrating the actuator.

FIGURE 6, a sectional view of the modified device showing the lock-over position for the actuator.

With reference to the drawings, it will be seen that the housing of the device is formed by a main housing member 10 which is substantially cylindrical in shape with a main cylindrical portion and a smaller, offset cylindrical portion 12 having a window 14 opening to the side and top of the housing. Two end caps 16 and 18 telescope over the ends of the housing 10 to enclose the space therewithin and a bolt 20 transfixes the two end caps 16 and 18 and holds them together in combination with a nut 22. The bolt 20 also fastens the housing 18 to a mounting bracket 24 which can be anchored as shown in FIGURE 3 to the floor pan of a vehicle by suitable bolts 26.

Each end cap is provided with a central hole 28 which mounts stub shafts 30 on a reel 32 which has a central wind cylinder 33 and two end plates 34, each of which is provided with mutually-opposed, ratchet-like recesses 36, four in number, spaced circumferentially around the end plates. The stub shafts 30 pass through and have a bearing mount in the holes 28 of the end caps.

Each end cap also has an elongated curved slot 40 in which is mounted, for movement therein, a locking pin 42 which has a head 44 at one end and a nut 46 at the other for retaining the pin in the slots 40. The movement of the pin 42 is also governed by two small lugs 48 and 50 shown in FIGURE 1, these lugs having holes in opposite ends. The bottom hole is transfixed by the pin 20 in each case and the bar or pin 42 passes through the top hole. With a fairly snug fit of the bolts or pins 20 and 42 in the lugs there is stabilization of the bar 42 for parallel movement relative to the housing; the position of this bar is also controlled by a Z-shaped spring 52 at each end of the assembly, this spring having a top hook portion 54 which overlies the stub shafts 30 and a loop portion 56 which is transfixed by the pin 42. In assembly, the bottom bight of the hook bears on the housing 10 and resiliently urges the locking bar to a forward position in the slots 40.

Also housed in the end caps 16 is a coil spring 60 which is preferably a coiled flat spring having a central diametrical portion 62 which is positioned to engage a slot 64 in each stub shaft. The other and outer end of the spring has a small tab 66 which will engage respectively notches 68 at the top of the housing 10. The two springs 52 and 60 are sandwiched between the interior surface of the end caps 16 and 18 and a reinforcing plate 70 at each end, which plate is dimensioned to be received within the end caps and shaped somewhat similarly, having a central hole 72 for stub shafts 30, a bottom forward hole 74 for the assembly bolt 20, and a curved slot 76 to permit the forward and rearward motion of the locking bar or pin 42.

The spool 32 will, of course, have a suitable fastening means for the end of a flat seat belt strip 80. It will also be seen that the recesses 36 in the side plates 34 of the reel are in ratchet form so that the reel can rotate clockwise as viewed from the left end in FIGURE 1, which would be an outreeling motion for the seat belt. This outreeling will, of course, be resisted by the coil springs 60 so that the spring will have a retracting motion when pressure on the seat belt is released. The selt belt threads out under the locking bar 42 through the window 14 and it will be evident that any quick, upward motion on the seat belt will move the locking bar 42 back to the recesses 36 and prevent further reel-out. The only resistance to the motion of the locking bar is the light spring 52 which tends to keep the bar in forward, non-locking position.

In FIGURE 3, a vehicle seat 84 is shown with a back 86 and centrally of this seat at the back edge thereof is a generally T-shaped bracket 90 which can be used for anchoring the seat belts in the secured position by any suitable hook or buckle device. When an occupant is in the seat with a seat belt fastened around him, it will be seen that the seat belt can move in and out of the housing freely with just the resistance of the spring 60 tending to recoil it. However, any sudden tension on the seat belt will cause the locking bar 42 to move inwardly and the reel can only make at most a quarter of a turn before it will be locked securely.

As has been previously pointed out, the seat belt is not dependent on any of the springs for its locking action since this is entirely a mechanical motion requiring no spring action. In fact, complete failure of springs 52 would permit the pin lock to operate by gravity to the release position. Thus, the seat belt can be worn by the passenger in considerable comfort and will adjust to the various positions of the passenger as he shifts in the seat in the normal use in the vehicle. Any abrupt strain or shock will immediately lock the device and provide the necessary protection. Release of the seat belt causes immediate retraction into the reel so that the buckles do not have to clutter up the seat. The seat belt is less apt to wrinkle the clothes of a passenger and because of its comfort there is more tendency for a driver or passenger to utilize it when it is available in a vehicle.

Another important feature is that the device will automatically adjust to the size of any particular person, whether it be an adult or a child without any need for manual manipulation of an adjustment means or buckle.

Another modification of the invention, illustrated in FIGURES 4, 5 and 6, has for its object the provision of a device which is versatile from the point of view of location so that it can be actuated by the safety belt regardless of the direction of pull. Thus, the strap can be pulled away from the reel or toward the reel and the locking action will take place. Another object is the provision of a construction which can be intentionally locked in position if this is desired to prevent automatic retraction of the belt.

The device as illustrated in FIGURE 4 has all of the elements of the device illustrated in FIGURE 1 with the exception that there is mounted adjacent the window 14 an actuator plate 116, this mounting being accomplished on lugs 118 and 120 on the main housing 10 at each side of the window 14 which are matched with lugs 122 and 124, these lugs being apertured to receive a pivot pin 126 having a head 128 and a retaining nut 130. The plate 116 which is mounted on the lugs 122–124 has a portion 132 (FIGURE 5) terminating in a rounded portion 134 to provide a slip surface for a belt 80; on the other side of the pivot pin 126 is a shorter portion 136 again terminating in a rounded portion 138 which will be in contact with the belt 80.

In the embodiment shown in these FIGURES 4 to 6, a hollow shaft portion 140 is provided with a shaft 142 which is provided with a flat portion 144 which serves to lock an end of the belt 80 inside the shaft 140 when turned and locked in a position which binds the belt between the flat portion and the inner wall of the shaft. The locking pin 142 can in turn be locked by a transverse pin (not shown).

As the parts are viewed in FIGURE 5, it will be seen that a direct upward pull on belt 80 would move the locking pin 42 into the ratchet areas of the end plates 34 to lock the device. On the other hand, if the belt is pulled in the direction shown in the full lines of FIGURE 5 in the direction shown by the arrow, there will be a pressure on the slip surface 134 which will produce a leverage force on the portion 132 of plate 116 and cause the lower end 136 of the plate to move toward the locking pin 42. Pressure exerted through the belt which is on the outer side of the pin 42 will move the pin inward to the locking rigid position. Thus, regardless of the direction of pull of the belt 80, the locking pin will be moved into a position which will prevent further reel-out of the belt.

On some occasions, it may be desirable to lock the belt in position so that the retraction spring is not putting a tension on it. This can be done by moving the plate 116 to the position shown in FIGURE 6 where the rounded portion 138 has moved past the locking pin 42 so that it is in an over-center position which retains the plate 116 in the position shown and locks the belt in the desired position. This locked position can be readily released by exerting an upward force on the slip bar 134.

The modification shown in FIGURES 4 to 6 can be used in certain installations where there is the possibility of belt action in more than one direction and it also permits the device to be mounted in one position or another depending on the convenience of the space and location so that the belt can operate regardless of the position relative to the seat.

What is claimed as new is as follows:

1. An automatic safety and comfort retraction reel for a seat belt which comprises:
   (a) a housing,
   (b) a bearing means at each end of said housing,
   (c) a biased reel for a safety belt mounted for rotation in said bearing means in said housing comprising a wind cylinder and end plates thereon having opposed pairs of ratchet recesses circumferentially spaced around said plates,
   (d) a locking pin mounted lengthwise of said housing parallel to the axis of said cylinder and moveable in a direction transversely of said axis against a bias from a single, non-locking position outside the reel to a locking position to enter and lock in respective ratchet recesses in said end plates, and
   (e) a safety belt mounted on said reel passing out of said housing threaded over and in contact with said locking pin, wherein sharp tension applied to said belt will directly move said pin from said non-locking position into a pair of ratchet recesses and lock said reel against rotation in said housing.

2. An automatic safety and comfort retraction reel for a seat belt which comprises:
   (a) a housing,
   (b) a biased reel for a safety belt mounted for rotation in said housing comprising a wind cylinder and means thereon forming circumferentially spaced ratchet recesses,
   (c) a locking means mounted lengthwise of said housing parallel to the axis of said cylinder and movable in a direction transversely of said axis against a bias from a single, non-locking position outside the reel to a locking position to enter and lock in a ratchet recess on said reel, and
   (d) a safety belt mounted on said reel passing out of said housing threaded over and in contact with said locking means wherein sharp tension applied to said belt will directly move said locking means from said non-locking position into engagement with a ratchet recess and lock said reel against rotation in said housing.

3. A device as defined in claim 2 in which said locking means comprises a pin extending lengthwise of said housing parallel to the axis of said wind cylinder and guided in arcuate recesses in said housing and movable by said belt from said non-locking position of clearance relative to said ratchet means to a locking position closer to the axis of said reel wherein engagement with said ratchet means occurs.

4. A device as defined in claim 3 in which means is provided to stabilize the motion of said locking pin in an arcuate path comprising small lugs pivoted at the lower end to said housing and transfixed by said locking pin at each end of said housing wherein to insure parallelism with respect to said locking pin and the axis of said reel.

5. An automatic safety and comfort retraction reel for a seat belt which comprises:
  (a) a housing with a substantially cylindrical shell portion having a main cylindrical portion and a smaller offset portion with a window opening to one side and the top of the housing adjacent the smaller offset portion,
  (b) end plates at each end of said housing having a central opening to serve as a bearing opening and a slotted opening to serve as a guide opening,
  (c) a reel for a safety belt mounted for rotation in said housing having a wind cylinder and opposed end plates thereon each having opposed ratchet recesses circumferentially spaced around said end plates and a stub shaft at each end of said reel mountable in said bearing openings of said ends of said housing,
  (d) a locking pin transfixing said end plates of said housing through said guide slots, said pin being movable toward and away from the axis of said reel in said guide slots,
  (e) lug means within each end plate of said housing pivotally mounted therein transfixed by said pin means,
  (f) a coil spring inside each end plate of said housing having a central end engaged with a stub shaft of said reel and an outer end engaged with said housing,
  (g) a second spring means having one end located by said stub shafts and the other end engaging and outwardly biasing said locking pin positioned adjacent said first spring means,
  (h) a retaining plate between the end plates of said reel and the end plates of said housing having openings for said stub shaft and said locking pin,
  (i) a bolt for retaining said assembly transfixing said end plates of said housing, said lugs, said second spring means, and said retaining plates, and
  (j) a safety belt mounted on said reel passing out of said window opening in said housing threaded past and in contact with said locking pin wherein sharp tension applied to said belt will directly move said pin against the action of said second spring into engagement with ratchet recesses of said reel end plates and lock said reel against rotation in said housing, said first spring serving to retract said reel and said belt upon release of tension on said belt.

6. An automatic safety and comfort retraction reel for a seat belt which comprises:
  (a) a housing,
  (b) a reel for a safety belt mounted for rotation in said housing comprising a wind cylinder and means thereon forming circumferentially spaced ratchet recesses,
  (c) a locking means mounted axially of and within said housing movable to a locking position to enter and lock in a ratchet recess on said reel,
  (d) actuating means on said housing mounted independently of said locking means positioned adjacent said reel and said locking means movable to a position to move said locking means toward said cylinder and said ratchet recesses, and
  (e) a safety belt mounted on said reel passing out of said housing between said locking means and said actuating means whereby tension applied to said belt tangentially of and radially of said reel will selectively, depending on the direction of tension, directly actuate said locking means or actuate said actuating means to move said locking means into engagement with said ratchet recesses and lock said reel against rotation in said housing.

7. A device as defined in claim 6 in which said actuating means comprises means pivoted on said housing having a first portion extending into said housing in the vicinity of said locking means and a lever portion extending away from said housing to serve selectively as a bearing surface for said belt whereby said lever portion will move said first portion and shift said locking means.

8. A device as defined in claim 7 in which said first portion of said actuating means is movable to a position over center beyond said locking means wherein said locking means and said actuating means are locked in position on either side of said belt wherein said belt is locked relative to said housing and said reel until released by reverse movement of said lever portion.

9. A device as defined in claim 6 in which said locking means comprises a bar mounted parallel to the axis of said cylinder and said actuating means comprises a lever having a projecting outer end, and an inner end positioned adjacent said locking means, said outer end being responsive to tension on said belt in a direction generally radially of said housing to actuate said locking means to a locking position, said bar being responsive to tension on said belt generally tangential to said reel to actuate said locking means to a locking position.

References Cited

UNITED STATES PATENTS

| | | | |
|---|---|---|---|
| 3,021,089 | 2/1962 | Becker | 242—107.3 |
| 3,100,669 | 8/1963 | Monroe. | |
| 3,323,832 | 6/1967 | Kirkpatrick | 242—107.4 X |
| 3,338,532 | 8/1967 | Board et al. | 242—107.4 |

FOREIGN PATENTS 1,006,966  10/1965  Great Britain.

MARVIN STEIN, Primary Examiner
WERNER H. SCHROEDER, Assistant Examiner

U.S. Cl. X.R.
297—388